United States Patent
Hormis et al.

(10) Patent No.: US 11,044,004 B2
(45) Date of Patent: Jun. 22, 2021

(54) WIDEBAND AND MULTI-BAND ARCHITECTURES FOR MULTI-USER TRANSMISSION WITH LENS ANTENNAS

(71) Applicant: QUALCOMM Incorporated, San Diego, CA (US)

(72) Inventors: Raju Hormis, New York, NY (US); Junyi Li, Chester, NJ (US); Juergen Cezanne, Ocean Township, NJ (US); Navid Abedini, Somerset, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/912,114

(22) Filed: Jun. 25, 2020

(65) Prior Publication Data

US 2021/0013953 A1   Jan. 14, 2021

Related U.S. Application Data

(60) Provisional application No. 62/873,552, filed on Jul. 12, 2019.

(51) Int. Cl.
*H04L 5/14* (2006.01)
*H04B 7/06* (2006.01)
*H04B 7/0408* (2017.01)
*H04B 7/08* (2006.01)

(52) U.S. Cl.
CPC ......... *H04B 7/0697* (2013.01); *H04B 7/0408* (2013.01); *H04B 7/086* (2013.01); *H04B 7/0897* (2013.01); *H04L 5/14* (2013.01)

(58) Field of Classification Search
CPC .. H04B 7/0617; H04B 7/2041; H04B 7/0408; H04B 7/086; H04B 7/0897; H04B 7/15542; H04L 5/14; H04W 16/28; G01S 2013/0254
See application file for complete search history.

(56) References Cited

U.S. PATENT DOCUMENTS

2019/0237874 A1* 8/2019 Michaelis .............. H01Q 15/02

FOREIGN PATENT DOCUMENTS

EP   2070157 A2   6/2009
WO  2014147482 A1  9/2014

OTHER PUBLICATIONS

International Search Report and Written Opinion—PCT/US2020/039892—ISA/EPO—dated Aug. 19, 2020.

* cited by examiner

*Primary Examiner* — Rahel Guarino
(74) *Attorney, Agent, or Firm* — Patterson & Sheridan, L.L.P

(57) ABSTRACT

Certain aspects of the present disclosure provide techniques and architectures for the use of multiple antenna technology which may enable a wireless communication system to exploit the spatial domain to support spatial multiplexing, beamforming, and transmit diversity over a wide frequency range and/or multiple bands to communicate with multiple users.

20 Claims, 11 Drawing Sheets

WIDEBAND AND MULTI-BAND ARCHITECTURES FOR MULTI-USER TRANSMISSION WITH LENS ANTENNAS

CROSS REFERENCE TO RELATED APPLICATIONS

This Application hereby claims priority under 35 U.S.C. § 119 to U.S. Provisional Patent Application No. 62/873,552, filed on Jul. 12, 2019, the contents of which are incorporated herein in their entirety.

BACKGROUND

Field of the Disclosure

Aspects of the present disclosure relate to wireless communications, and more particularly, to architectures that utilize lens antennas for multi-user transmission.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to an apparatus for wireless communications. The apparatus generally includes N sets of radio frequency (RF) chains, each RF chain of a given set being configured to generate or process RF signals for a different frequency band and N combiners, each combiner being configured to, for a corresponding one of the N sets of RF chains, generate a multi-band signal by combining RF signals for different frequency bands generated by at least two of the RF chains of the corresponding set of RF chains and to feed the multi-band signal to a lens antenna for transmission via a first transmit beam.

Certain aspects of the disclosure relate to an apparatus for wireless communications. The apparatus generally includes a first set of radio frequency (RF) chains, each RF chain of the first set being configured to generate or process RF signals for a different frequency band, a first combiner configured to generate a first multi-band signal by combining RF signals for different frequency bands generated by at least two of the RF chains of the first set and feed the first multi-band signal to a lens antenna for transmission via a first transmit beam, a second set of radio frequency (RF) chains, each RF chain of the second set being configured to generate or process RF signals for a different frequency band, and a second combiner configured to generate a second multi-band signal by combining RF signals for different frequency bands generated by at least two of the RF chains of the second set and feed the second multi-band signal to the lens antenna for transmission via a second transmit beam.

Certain aspects also include various means and methods corresponding to the functions of the elements described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
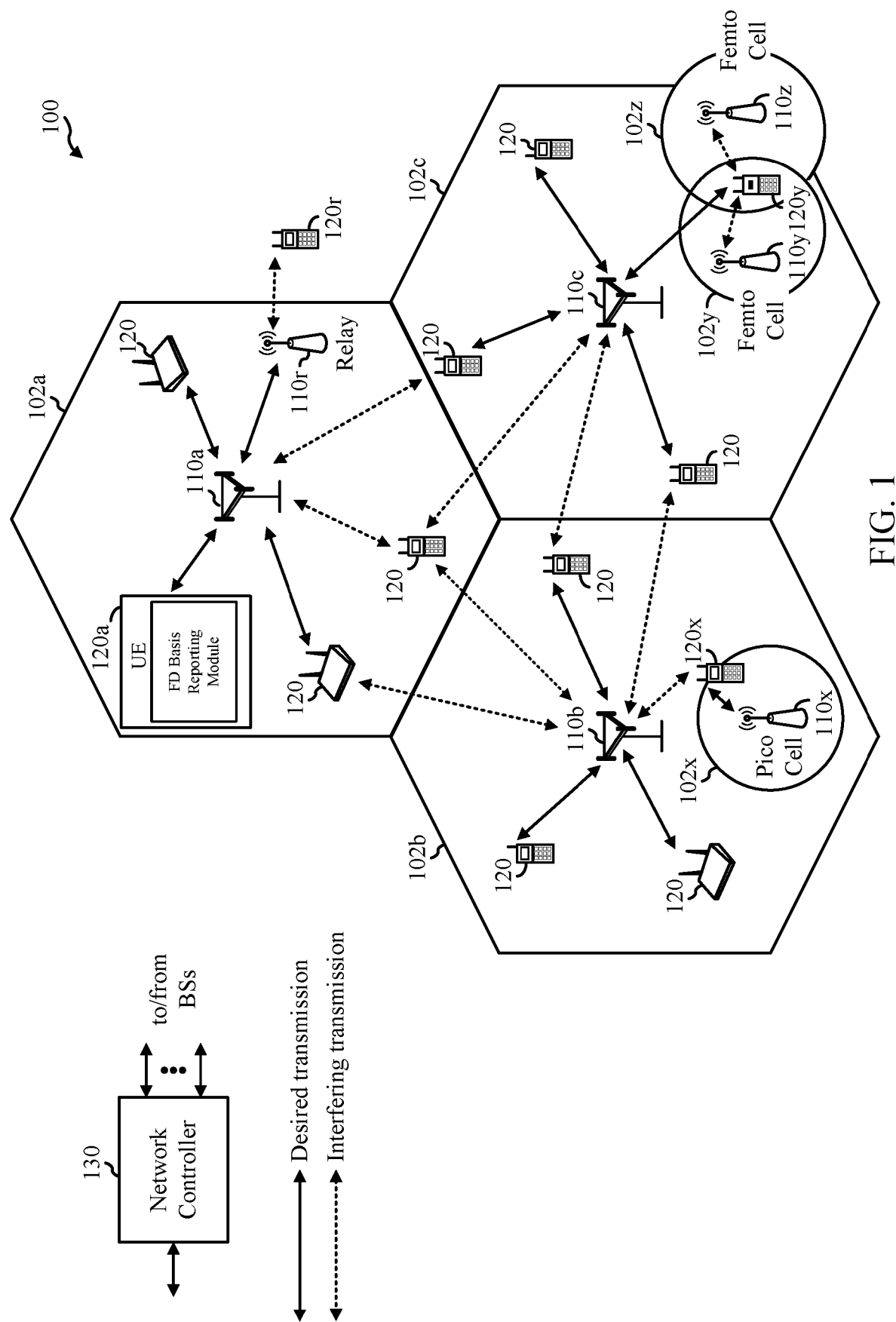
FIG. 1 is a block diagram conceptually illustrating an example telecommunications system, in accordance with certain aspects of the present disclosure.

Aspects of the present disclosure provide apparatus and methods for multi-user transmission schemes that utilize lens antennas.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a base station 110 may perform operations 400 shown in FIG. 4 to perform wideband multi-user wireless communications via a lens antenna using one of the example architectures shown in FIGS. 8-11.

The wireless communication network 100 may be, for example, a New Radio (NR) or 5G network.

As illustrated in FIG. 1, the wireless communication network 100 may include a number of base stations (BSs) 110 and other network entities. A BS may be a station that communicates with user equipment (UE). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
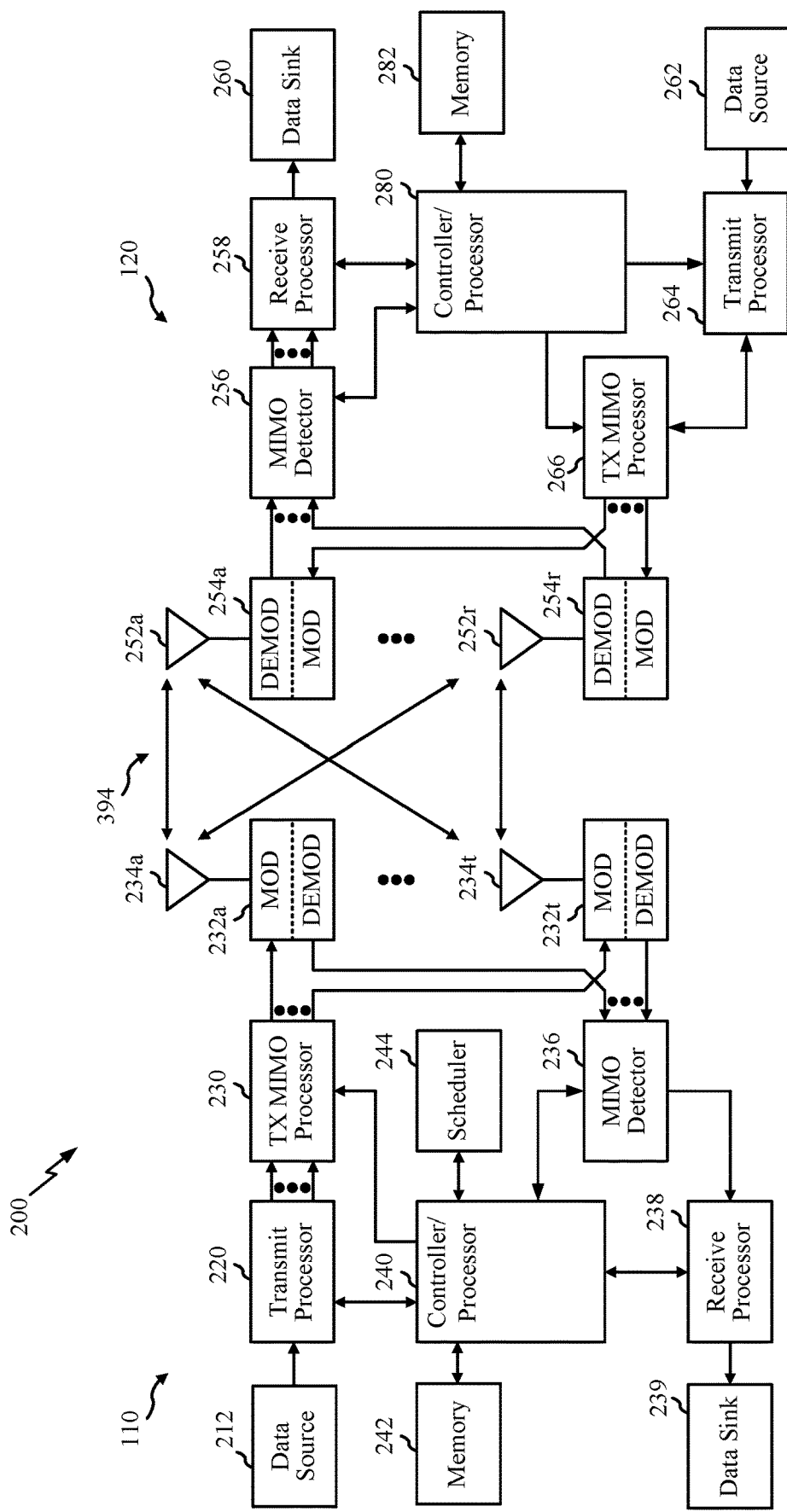
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 120, the antennas 252*a* through 252*r* may receive the downlink signals from the base station 110 and may provide received signals to the demodulators (DEMODs) in transceivers 254*a* through 254*r*, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators of transceivers 254*a* through 254*r*, perform MIMO detection on the received symbols if applicable, and provide detected symbols. A receive processor 258 may process (e.g., demodulate, de-interleave, and decode) the detected symbols, provide decoded data for the UE 120 to a data sink 260, and provide decoded control information to a controller/processor 280.

In a MIMO system, a transmitter (e.g., BS 110) includes multiple transmit antennas 234*a* through 234*t*, and a receiver (e.g., UE 120) includes multiple receive antennas 252*a* through 252*r*. Thus, there are a plurality of signal paths 294 from the transmit antennas 234*a* through 234*t* to the receive antennas 252*a* through 252*r*. Each of the transmitter and the receiver may be implemented, for example, within a UE 120, a BS 110, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a* through 254*r* (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

As noted above, the use of multiple antenna technology enables the wireless communication system to exploit the spatial domain to support spatial multiplexing, beamforming, and transmit diversity.

Figure 5:
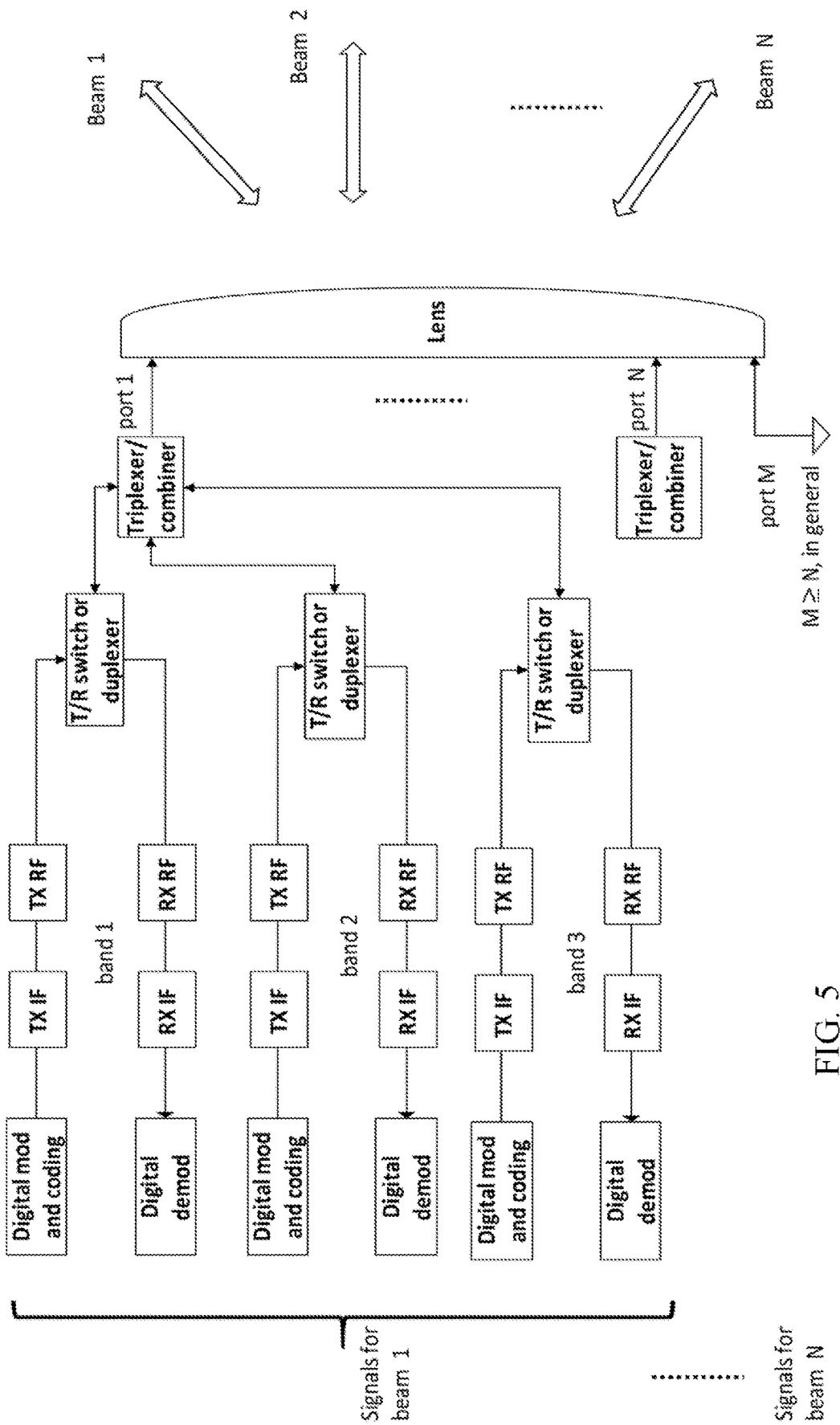
FIG. 5 illustrates an example architecture for multi-user transmission with a lens antenna, in accordance with certain aspects of the present disclosure.

FIG. 5 illustrates an example system utilizing beamforming and performing a beam training procedure. Beamforming generally refers to a mechanism that identifies the most efficient data-delivery route (path) to a particular user, and it reduces interference for nearby users in the process. Beamforming can help base stations and the UEs they serve (with possibly hundreds of individual antennas) make more efficient use of the spectrum around them. The primary challenge for massive MIMO is to reduce interference while transmitting more information from many more antennas at once. Beamforming algorithms may identify the best transmission route through the air to each user. Then they can send individual data packets in many different directions (even using reflections off objects in a precisely coordinated pattern). By choreographing the packet routes and arrival times, beamforming allows many users and multi-antenna base stations to exchange much more information at once.

For systems utilizing millimeter waves (high-frequency waves used in 5G networks), beamforming may help address other types of problems. For example, beamforming may help address that millimeter wave signals are highly directional, easily blocked by objects, and tend to weaken over long distances. In this case, beamforming can help by focusing a signal in a concentrated beam that points only in the direction of a user, rather than broadcasting in many directions at once. This approach can strengthen the chances of signals arriving intact and reduce interference to other users.

In some cases, beamforming may be adjusted using a procedure referred to as beamforming training. In some cases, the training may involve a receiving device (e.g., a base station or UE) measuring phase information at each antenna for a given beam pair. For example, the receiving device may measure and record phase difference information while evaluating different beam pairs during a beam training procedure, as illustrated in FIG. 3.

Figure 3:
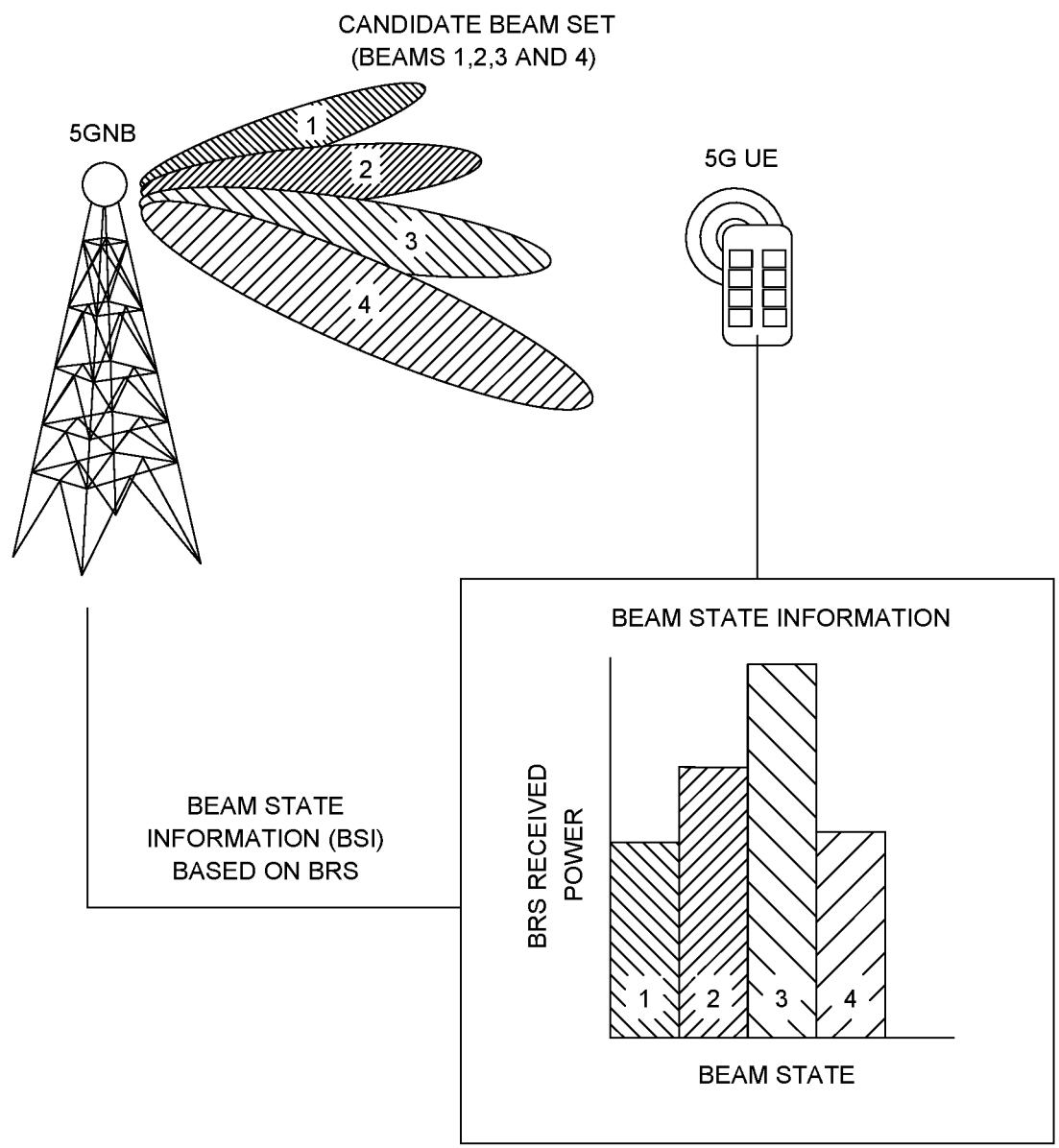
FIG. 3 illustrates an example beam training procedure.

In the example illustrated in FIG. 3, the UE maintains a candidate beam set (e.g., 4 beams). For each beam the UE reports the beam state information (BSI). The BSI may include beam reference signal received power (BRSRP), for each beam (identified by a beam index). Typically, a UE reports the BSI for the beams with the highest BRSRP in the candidate beam set. Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

Example Architectures for Multi-User Transmission Using a Lens Antenna

As noted above, the use of multiple antenna technology enables the wireless communication system to exploit the spatial domain to support spatial multiplexing, beamforming, and transmit diversity. This may allow support of wideband architectures, allowing communications over a wide frequency range and/or multiple bands.

For example, wideband support may enable dual-connectivity (DC) and inter-band carrier aggregation (CA). For example, inter-band CA may involve defined frequency bands FR1 (sub-6 GHz) and FR2 (24.25-52.6 GHz), and may be expanded to cover additional bands, such as FR4 (e.g., which may be considered to include frequency bands above 52 GHz). Wideband support may also enable E-UTRAN New Radio—Dual Connectivity (EN-DC), for example, where E-UTRAN refers to LTE and New Radio (NR) refers to 5G.

Aspects of the present disclosure propose using a lens antenna that uses a single lens to produce N beams concurrently to accomplish beamforming across multiple bands. In some cases, fragility of a lens antenna may make deployment more suitable for a (stationary) base station, but deployment in other devices (e.g., UEs) may be possible (e.g., as advanced materials may allow smaller/more robust lens antenna designs).

A lens antenna generally performs true-time-delay shifting (TTD), which allows extremely wideband beamforming. The time-shifting is enabled by variable propagation pathlengths within the lens and/or variable refractive indexes within lens. As will be described in greater detail, metamaterials may be used in constructing a lens antenna and/or other components in a wideband/multi-band architecture to achieve desired results described herein.

The architectures proposed herein utilize a lens antenna to produce multiple beams as an alternative (or in addition) to the conventional use of multiple phased arrays. In some cases, a lens antenna may replace multiple phased antenna arrays, resulting in a significant reduction in complexity. For example, conventional phased-array antennas may be used for beam-forming spherical wave-fronts to collimated plane waves. Such phased-arrays, however, require phase-shifters and combiners/splitters for each beam, resulting in $N^2$ phase-shifters for N beams with N antennas. Another method of beam-forming is the Butler matrix. The implementation of a Butler matrix may require N/2 log 2 N directional couplers and phase-shifters to produce N beams with N antennas.

In contrast, a lens-antenna uses a single lens to produce N beams using true-time-delay shifting (TTD) to achieve (extremely) wideband beamforming. As noted above, this may be achieved by variable propagation path-lengths and/or variable refractive indexes within the lens.

Lens antennas may be used in a variety of applications that require multiple beans or very wideband beams, such as local microwave distribution system (LMDS) or other fixed link backhaul applications. In such applications operators may use lens antennas for high gain and/or high frequency (microwave) but typically in a single band due to mmW licenses (e.g., 28.5 GHz, 29.3 GHz, etc.).

Aspects of the present disclosure, however, propose architectures that utilize a lens antenna to produce N beams concurrently to accomplish beamforming across a wide frequency range. For example, the architectures described herein may support inter-band CA for FR1, FR2, and/or FR4. Such architectures may provide a single beamforming system supporting sub-6 GHz and millimeter wave signals that conventionally require separate beamforming systems. Utilizing the architectures proposed herein, base stations (which may include access points) may transmit multiple data streams to multiple UEs simultaneously.

Figure 4:
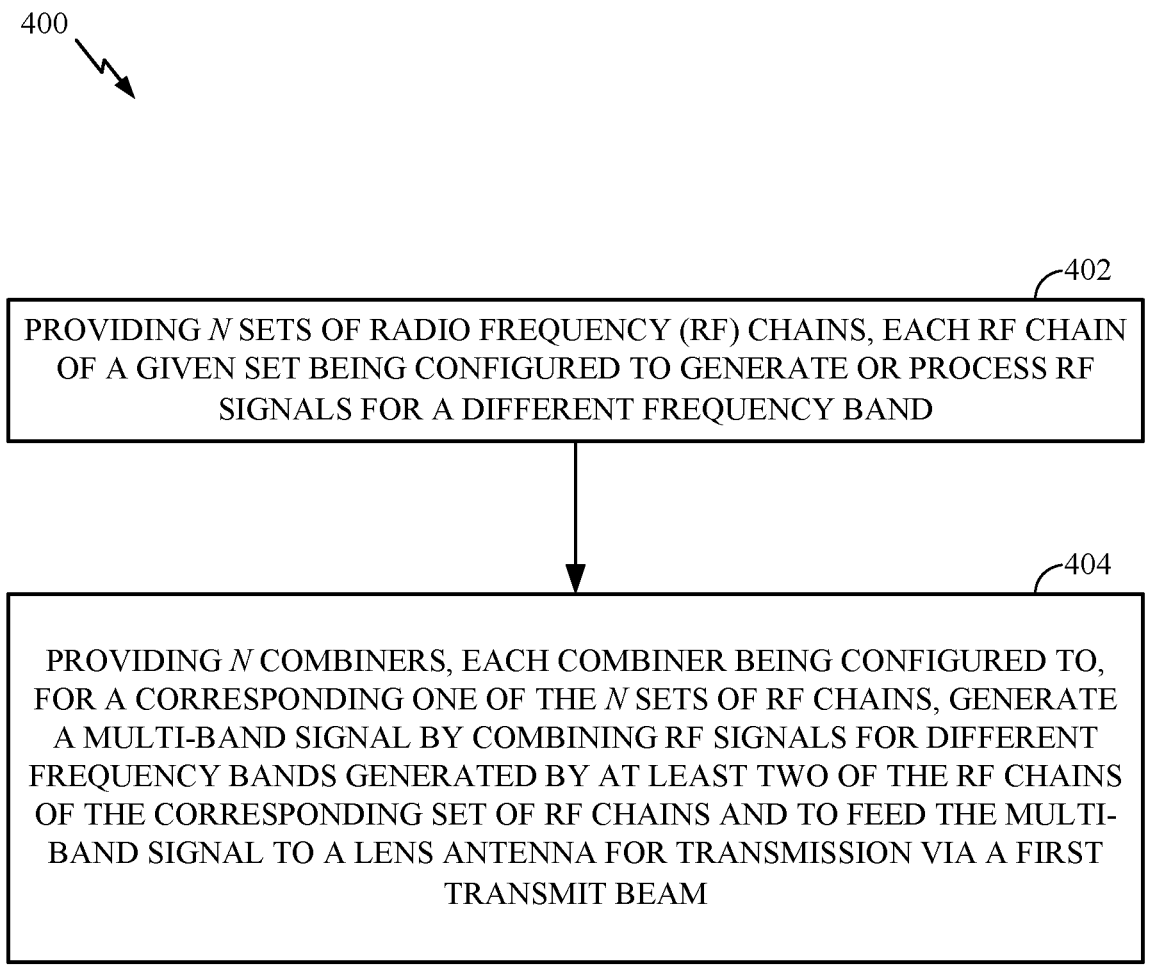
FIG. 4 illustrates an example method for wireless communications, in accordance with certain aspects of the present disclosure.

FIG. 4 illustrates example operations 400 for wireless communications utilizing a lens antenna, in accordance with certain aspects of the present disclosure.

Operations 400 begin, at 402, by providing N sets of radio frequency (RF) chains, each RF chain of a given set being configured to generate or process RF signals for a different frequency band.

At 404, N combiners are provided, each combiner being configured to, for a corresponding one of the N sets of RF chains, generate a multi-band signal by combining RF signals for different frequency bands generated by at least two of the RF chains of the corresponding set of RF chains and to feed the multi-band signal to a lens antenna for transmission via a first transmit beam.

Referring to the example architecture shown in FIG. 5, each set of RF chains may handle signals for one beam (e.g., for one user). As used herein, the term RF chain generally refers to circuitry between the antenna and a signal processor (e.g., a digital baseband processor). A receive (RX) RF chain may include components in the receiver that process the signal at the original incoming radio frequency (RF), before it is converted to a lower intermediate frequency (IF) while, conversely, a transmit (TX) RF chain may include components to take a lower IF signal and generate an RF signal for transmission.

As illustrated, a combiner (e.g., a triplexer in the illustrated example) may combine signal processing from multiple different bands (3 in the illustrated example) and feed the combined multi-band signal into a port of the lens antenna. A triplexer may generally refer to a combiner that includes some filtering and corresponding frequency selectivity (e.g., while getting one band, it may reject other bands). In some cases, TX and/or RX RF chains may have their filtering, making it unnecessary to include filtering in the combiner.

As illustrated, each of the N sets of RF chains may have a similar combiner to feed a respective port of the lens antenna, corresponding to a beam (e.g., for a different user). In some cases, more than one of the N beams may be for a same user. On the receive (RX) side, a combined RF signal may be fed from a port to the corresponding RX RF chains. As illustrated, in some cases, a transmit/receive switch (or duplexer) may be used to route the Tx RF signals from each Tx RF chain (corresponding to a different band) to the lens antenna port (via the combiner) and to route the Rx RF signals from the lens antenna port (via the combiner/decombiner) to corresponding Rx RF chain.

Figure 6:
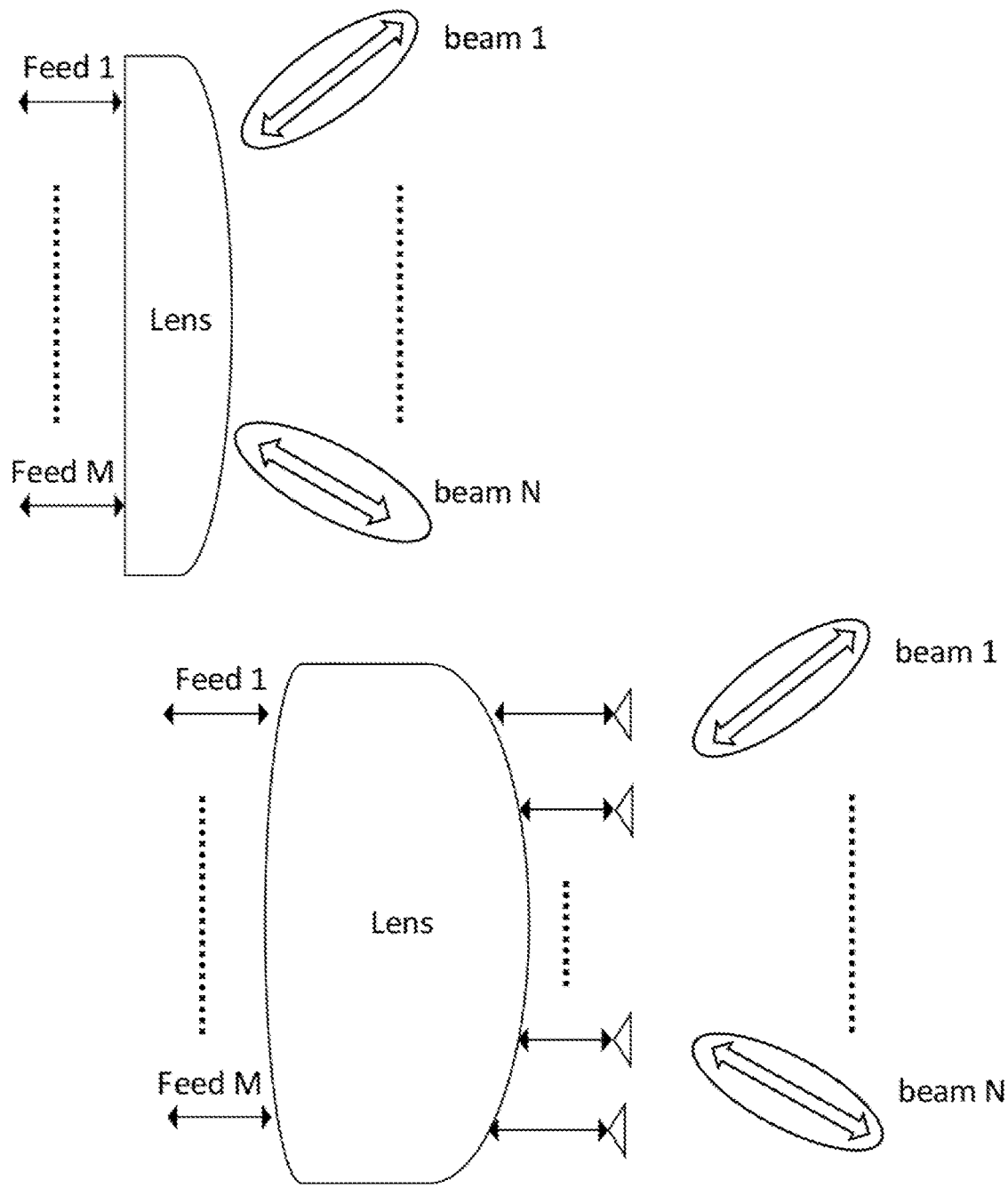
FIGS. 6 and 7 illustrate example lens antennas that may be utilized in the example architectures presented herein.
Figure 7:
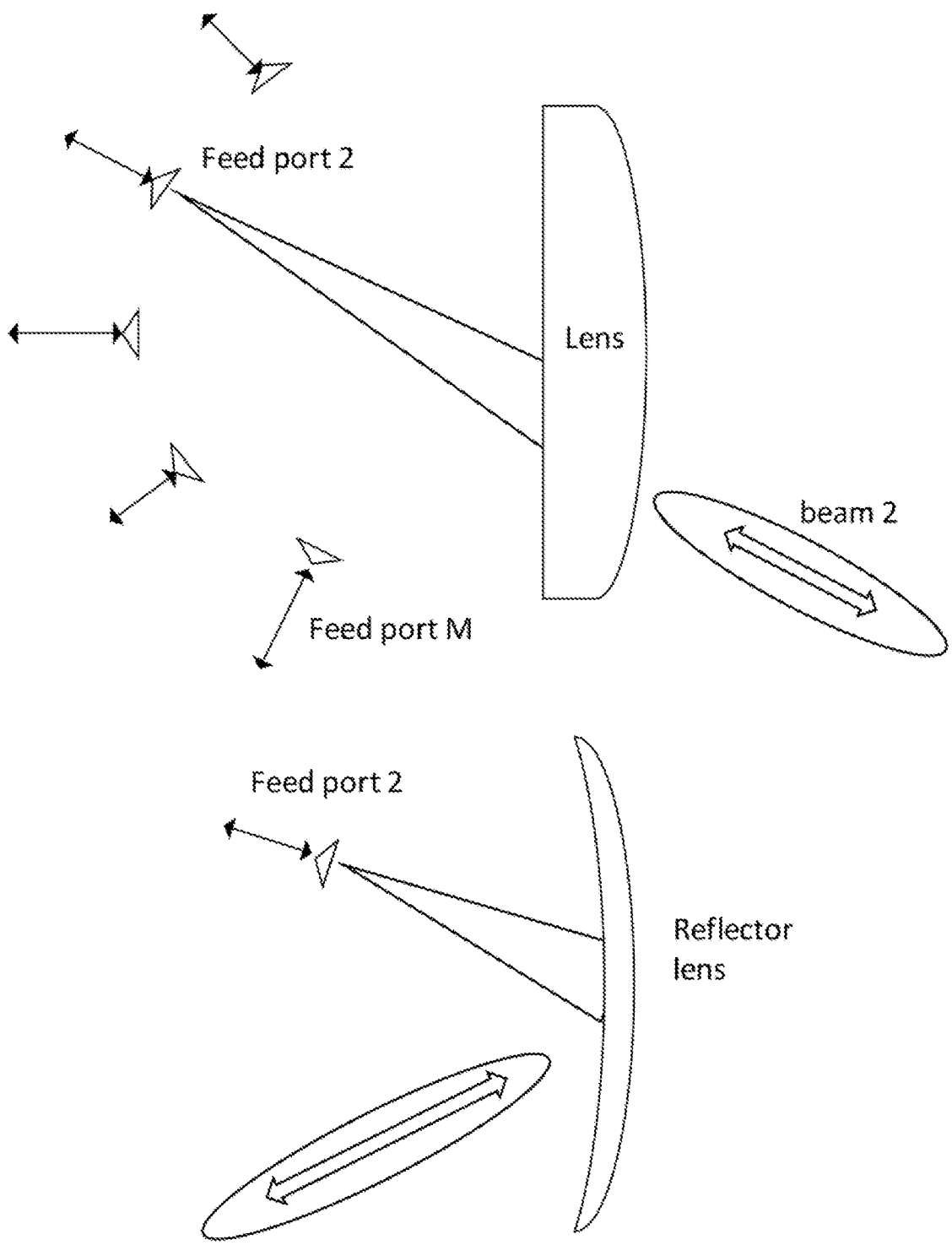

FIGS. 6 and 7 illustrate example lens antennas that may be utilized in the example architectures presented herein.

As illustrated, a lens antenna generally has M feed ports and a lens. The lens could function as the aperture, or (as shown in the bottom arrangement of FIG. 6) excite an antenna or an array of antennas to generate up to N beams, where M≥N (e.g., in which case some ports may have to be terminated). Lens antennas can be broadly classified by geometry (e.g., spherical, hyper-hemispherical, etc.) and/or Homogeneity of refractive index (e.g., Uniform or nonuniform). In some cases, the feed ports may feed a reflector lens, as shown in the bottom arrangement of FIG. 7.

Benefits to using lens antennas may include the ability to support multiple beams, wideband signals (e.g., time-shift vs phase-shift), low insertion loss (since there are few interconnects), good isolation between feed ports, and agile beam-switching, since all beams are simultaneously available. Advancements have led to significant reductions in the difficulty of manufacturing of lens antennas with reduced bulk, size, and/or fragility. Such advancements include, for example, the use of meta-surfaces (meta-materials), 2-D planar architectures, and smaller apertures (e.g., for millimeter-wave signals).

In some cases, a certain type of amplifier arrangement may be used to feed the lens antenna parts. For example, lens antennas, by definition, map one port per beam, which may require relatively large power amplifiers (PAs) when compared to phased-arrays, where the PAs are naturally distributed. This presents a challenge when using lens antennas since, for a given semiconductor process/geometry/supply voltage, larger PAs may be difficult to design. Aspects of the present disclosure, however, propose arrangements to combine power from multiple PAs with an N-way power combiner. Such arrangements may be designed to mitigate mismatch of each branch of combiner and may include distributed PAs and/or stacked PAs.

In some cases, meta-materials and/or meta-surfaces may be used to achieve desired properties (of a lens antenna and/or components of the RF chain). As used herein, a meta-material may refer to any material of tunable electrical permittivity and/or magnetic permeability, generally man-made that does not occur in nature. Recent advances in meta-materials and/or meta-surfaces have been made possible due to nano-fabrication methods. Besides the lens antenna, virtually every component in the RF chain can also be designed with meta materials (e.g., antennas, switches, phase-shifters, waveguides, couplers, filters/resonators, oscillators, duplexers/circulators, and the like). Meta-materials may be used to achieve a desired refractive index (refractive index is a function of permittivity and permeability-Snell's law, from Maxwell's equations) and can be designed for negative permittivity and/or permeability, and hence, negative refractive index.

Meta materials may also be referred to as left-handed materials, Epsilon negative (ENG) materials, double-negative materials, negative refractive index materials, or Chiral materials. Examples of applications of such materials in wireless communications include re-configurable antennas (e.g., for dynamic beamforming), electrically small antennas (smaller than λ/10) that retain high efficiency and bandwidth, radio-transparent antennas to allow antenna stacking, limit scatter and mutual coupling. Other example applications include phased-shifters implemented by tuning the dielectric of waveguides, non-magnetic circulators, which are needed for duplexing, lower insertion loss. Meta materials may also be designed for use in circuits from sub-6 GHz to several THz, can have very low power consumption, and may be used to design super-resolution lenses, for example, that operate below the diffraction limit.

FIGS. 8-11 illustrate example architectures that utilize a lens antenna for wideband beamforming in accordance with aspects of the present disclosure. In some cases, the same components may be used to achieve the various architecture. For example, configurable switches may be controlled to route signals from RF chains and/or combiners to achieve the architectures shown in FIGS. 8-11. This may provide flexibility in re-configuring a given device or adapting a module for use in different devices.

While a triplexer is shown in each of FIGS. 8-11 for illustration, the combiner may be implemented as a duplexer/triplexer/quadplexer (depending on the number of bands) or any other passive frequency division (FD) multiplexer or Wilkinson combiner. As noted above, power amplifiers (PAs) may be distributed, stacked or combined for higher power.

Figure 8:
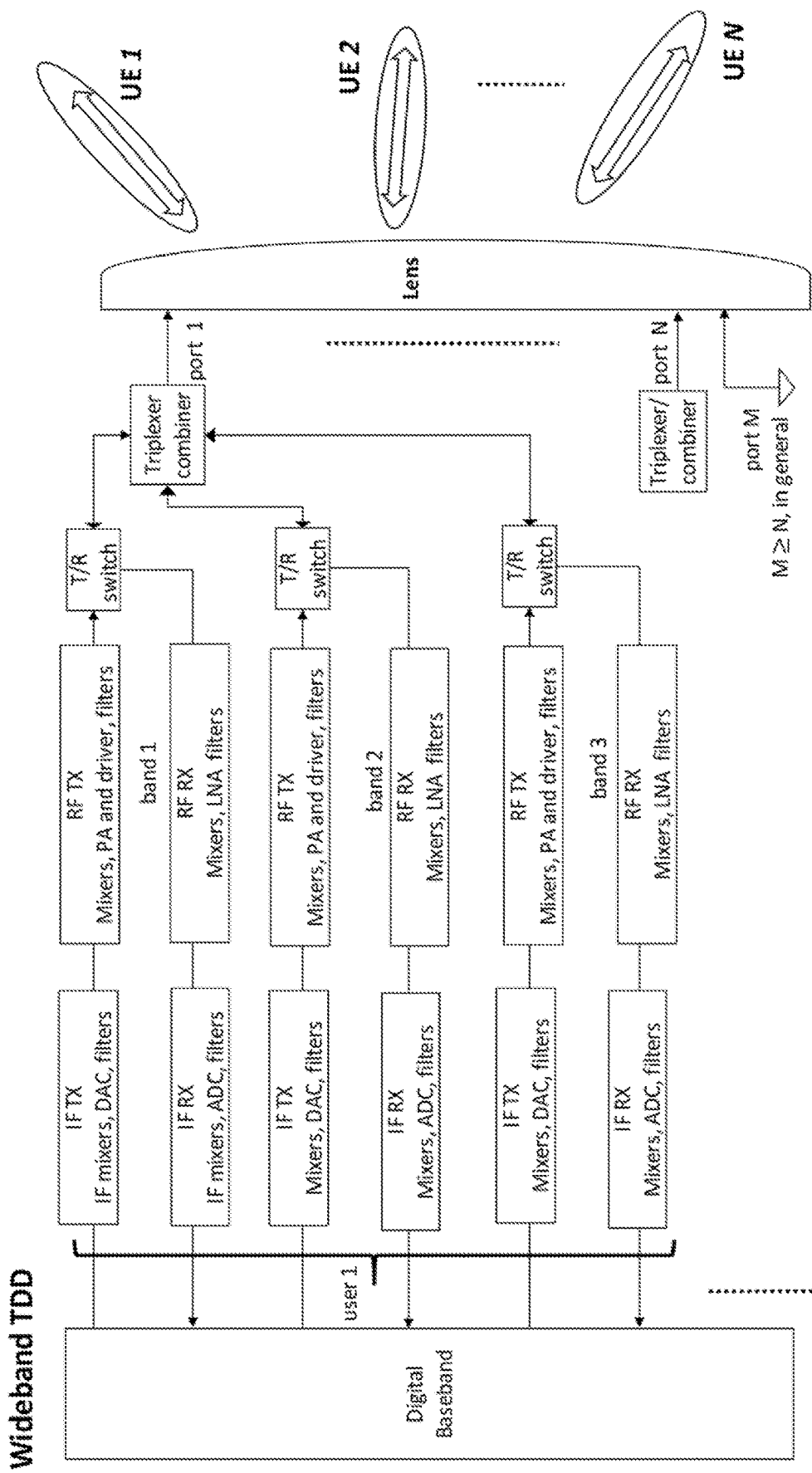
FIG. 8 illustrates an example architecture for wideband time division duplexed (TDD) multi-user transmission with a lens antenna, in accordance with certain aspects of the present disclosure.

FIG. 8 illustrates an example architecture for wideband time division duplexed (TDD) multi-user transmission with a lens antenna, in accordance with certain aspects of the present disclosure.

The architecture of FIG. 8 may be implemented, for example, in a gNB to transmit N ultra-wideband beams (e.g., spanning FR1, FR2, and/or FR4) to up to N UE's simultaneously in a time division duplexed (TDD) mode. As illustrated, a transmit/receive (T/R) switch may be used to toggle between downlink (DL) communications (where the ports are feeding RF signals from the TX RF chains to the lens antenna) and uplink (UL) communications (where received RF signals are routed from the lens antenna to the RX RF chains). With a triplexer, simultaneous RX and TX could be performed, for example, with TX on some ports, Rx on other ports (or both). As an example, DL transmission could be sent on Band 1, while UL transmissions are received on Band 2, while Band 3 may be used for some UL and some DL.

Figure 9:
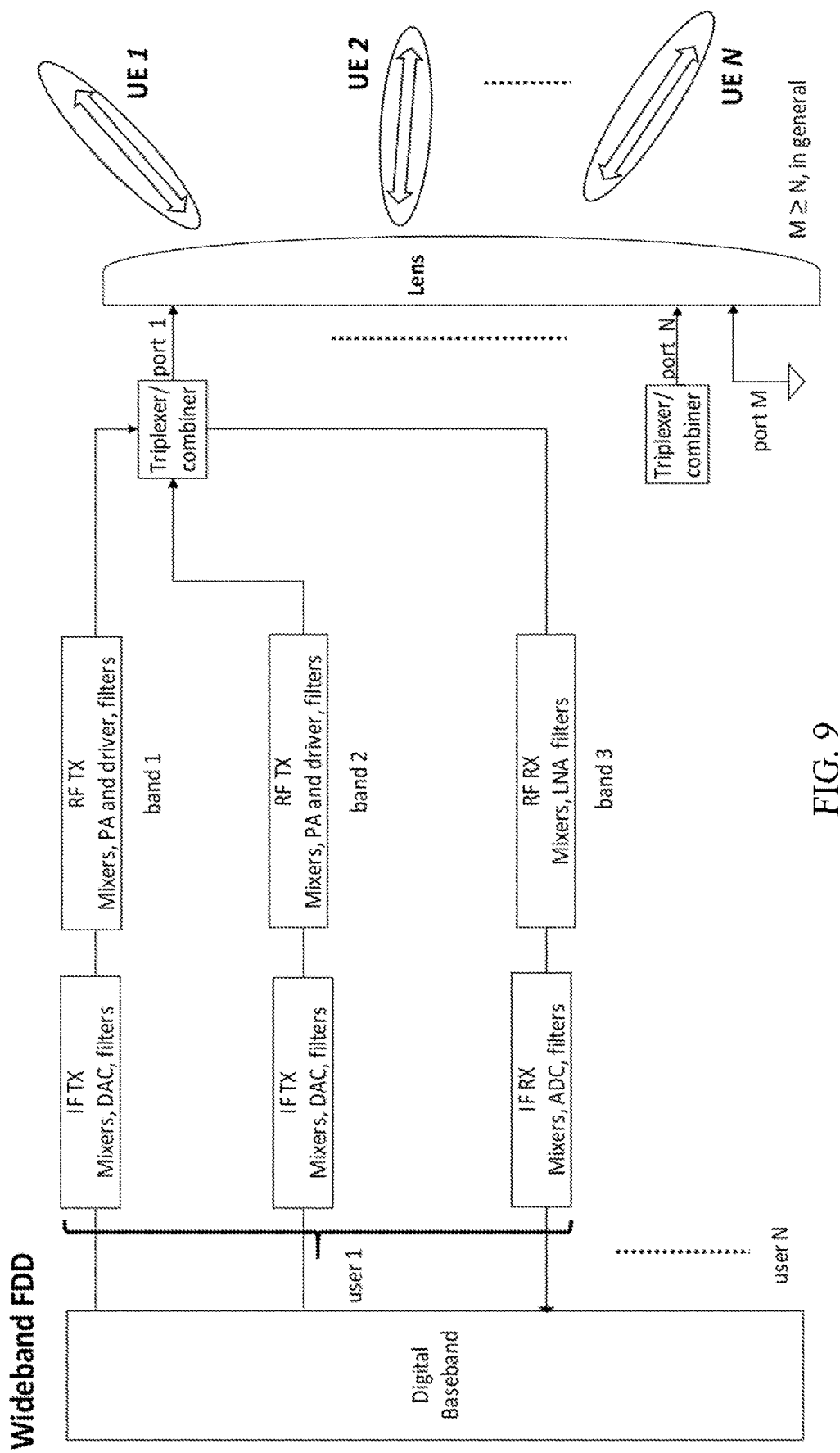
FIG. 9 illustrates an example architecture for wideband frequency division duplexed (FDD) multi-user transmission with a lens antenna, in accordance with certain aspects of the present disclosure.

FIG. 9 illustrates an example architecture for wideband frequency division duplexed (FDD) multi-user transmission with a lens antenna, in accordance with certain aspects of the present disclosure.

The architecture of FIG. 9 may be implemented, for example, in a gNB to transmit N ultra-wideband beams (e.g., spanning FR1, FR2, and/or FR4) to up to N UEs simultaneously in a frequency division duplexed (FDD) mode. The FDD mode may allow, for example, for UL on certain bands and DL on other bands (e.g., for Supplementary UL and DL, as defined in Rel. 15/16) and the particular UL and DL band choices shown are for illustration purposes only.

Figure 10:
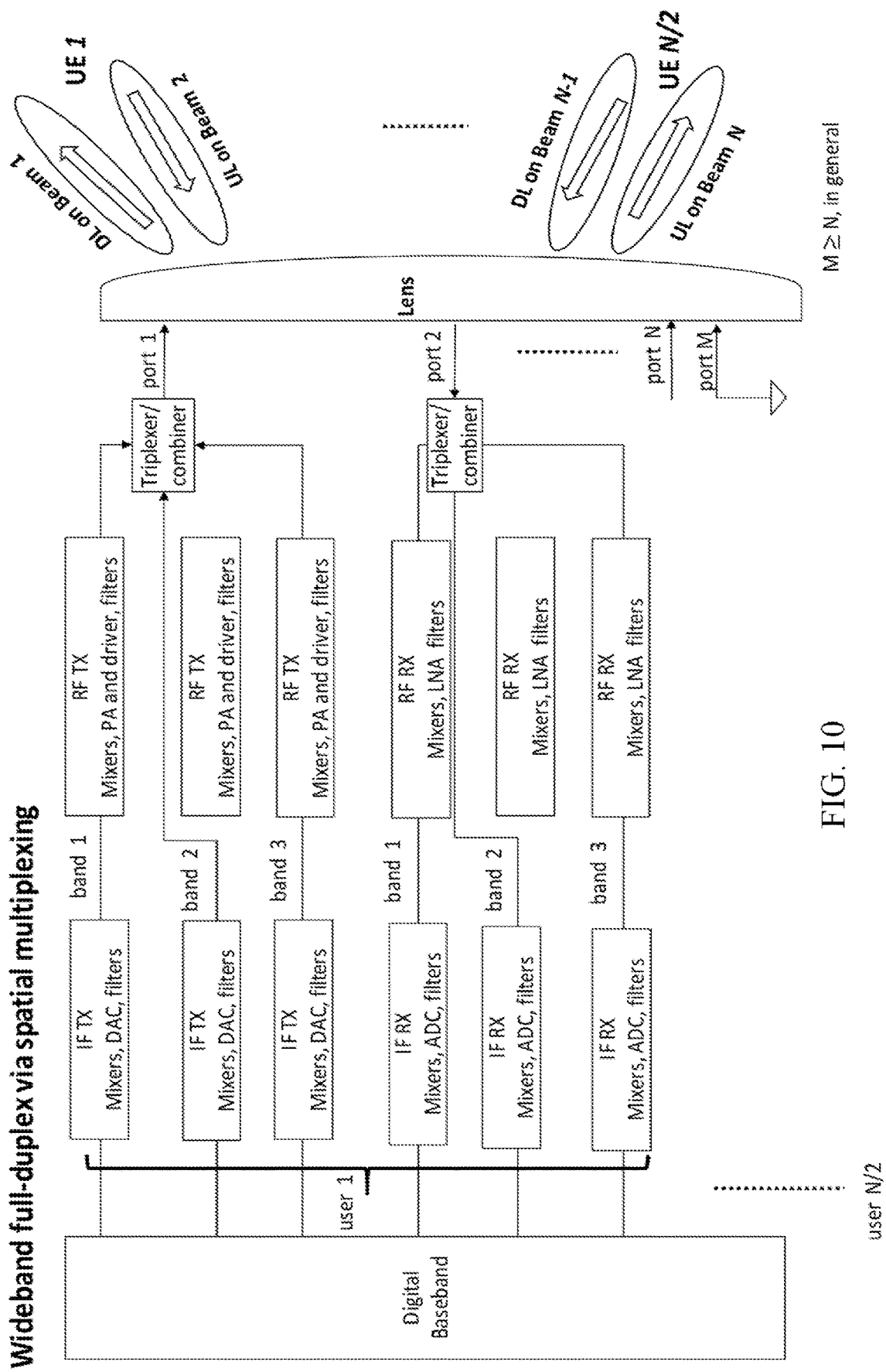
FIG. 10 illustrates an example architecture for wideband full duplex multi-user transmission via spatial multiplexing with a lens antenna, in accordance with certain aspects of the present disclosure.

FIG. 10 illustrates an example architecture for wideband full duplex multi-user transmission via spatial multiplexing with a lens antenna, in accordance with certain aspects of the present disclosure.

The architecture of FIG. 10 may be implemented, for example, in a gNB to transmit N ultra-wideband beams to up to N/2 UEs simultaneously in a space-division (SD) full-duplexed mode. In other words, the arrangement may allow for concurrent DL and UL on separate beams. In the illustrated example, a combination of band 1, band 2, and band 3, are combined on 1 beam (port 1) for DL (the top 3 in TX), while a second beam (beam 2) is used for receiving a combined UL RF signal fed to the RX RF chains via port 2. With this arrangement of separate ports for UL and DL, if there are N possible beams, N/2 users may be supported.

Figure 11:
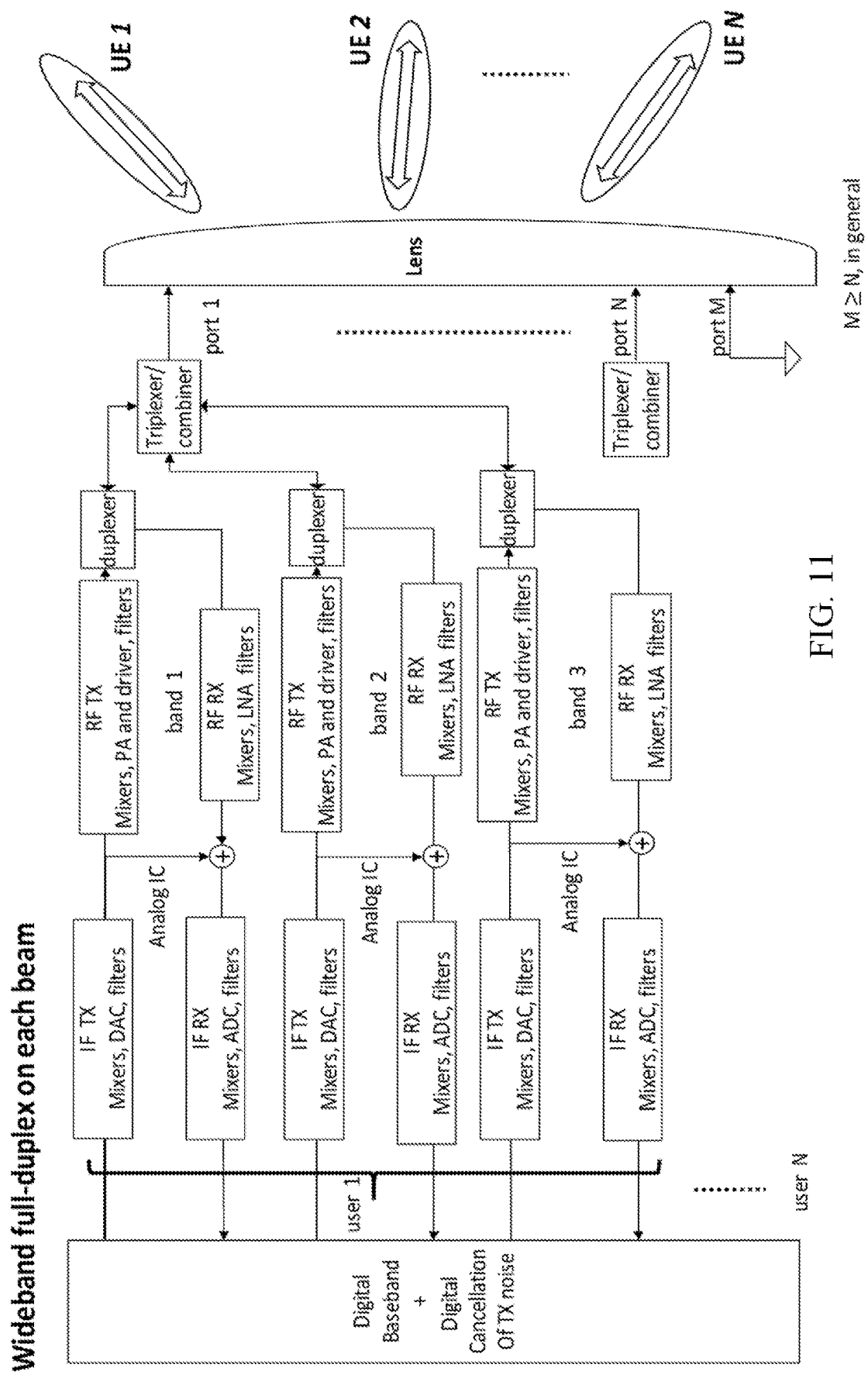
FIG. 11 illustrates an example architecture for wideband full duplex multi-user transmission on each beam with a lens antenna, in accordance with certain aspects of the present disclosure.

FIG. 11 illustrates an example architecture for wideband full duplex multi-user transmission on each beam with a lens antenna, in accordance with certain aspects of the present disclosure.

The architecture of FIG. 11 may be implemented, for example, in a gNB to transmit N ultra-wideband beams to up to NUEs simultaneously in a per-beam full-duplex mode. As illustrated, a duplexer (e.g., circulator, branch-line coupler, or any other directional coupler) may be used for concurrent DL and UL.

In some cases, circuitry may be used to perform correction due to imperfections in the duplexers (e.g., leading to self-interference). As illustrated, separate analog component may be used for such correction and/or digital cancellation may be performed in a processor (e.g., a digital baseband processor).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receiver unit 232) or an antenna(s) 234 of the access point 110 or the receiver unit 254 or antenna(s) 252 of the station 120 illustrated in FIG. 2. Means for transmitting or means for outputting may include a transmitter (such as the transmitter unit 232) or an antenna(s) 234 of the access point 110 or the transmitter unit 254 or antenna(s) 252 of the station 120 illustrated in FIG. 2. Means for generating, means for processing, means for feeding, means for amplifying, means for cancelling self-interference and/or means for routing may include a processing system, which may include one or more processors, such as the RX data processor 238, the TX data processor 220, the TX spatial processor 230, RX spatial processor, or the controller 240 of the access point 110 or the RX data processor 258, the TX data processor 264, the TX spatial processor 266, RX spatial processor, or the controller 280 of the station 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various processor shown in FIG. 2 may be configured to perform operations 400 of FIG. 4.

The various illustrative logical blocks, modules and circuits described in connection with the present disclosure may be implemented or performed with a processing system which may include one or more (or a combination of) a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein (e.g., instructions for performing the operations described herein and illustrated in FIGS. 8 and 9).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a first set of radio frequency (RF) chains, each RF chain of the first set being configured to generate or process RF signals for a different frequency band;
a first combiner configured to:
generate a first multi-band signal by combining RF signals for different frequency bands generated by at least two of the RF chains of the first set; and
feed the first multi-band signal to a lens antenna for transmission via a first transmit beam;
a second set of radio frequency (RF) chains, each RF chain of the second set being configured to generate or process RF signals for a different frequency band; and
a second combiner configured to:
generate a second multi-band signal by combining RF signals for different frequency bands generated by at least two of the RF chains of the second set; and
feed the second multi-band signal to the lens antenna for transmission via a second transmit beam.

2. The apparatus of claim 1, wherein the apparatus comprises:
a number of sets of RF chains (N sets), said N sets including the first and second sets of RF chains, each RF chain of a given one of the N sets being configured to generate or process RF signals for a different frequency band; and
a number of combiners (N combiners), said N combiners including the first and second combiners, each of the N combiners configured to, for a corresponding one of the N sets, generate a multi-band signal by combining RF signals for different frequency bands generated by at least two of the RF chains of the corresponding set of RF chains and to feed the multi-band signal to the lens antenna for transmission via a transmit beam.

3. The apparatus of claim 2, wherein:
one or more of the N sets comprise at least two RF chains configured to generate RF signals for first and second frequency bands and at least one RF chain configured to process RF signals for a third frequency band.

4. The apparatus of claim 1, wherein:
the first set of RF chains comprises at least two RF chains configured to generate RF signals for first and second frequency bands and at least one RF chain configured to process RF signals for a third frequency band; and
the second set of RF chains comprises at least two RF chains configured to generate RF signals for the first and second frequency bands and at least one RF chain configured to process RF signals for the third frequency band.

5. The apparatus of claim 1, wherein:
the first set of RF chains comprises at least one of distributed, stacked, or combined amplifier configured to amplify the first multi-band signal; and
the second set of RF chains comprises at least one of distributed, stacked, or combined amplifier configured to amplify the second multi-band signal.

6. The apparatus of claim 1, wherein at least one of a component in the first set of RF chains or a component in the second set of RF chains comprises a meta-material.

7. The apparatus of claim 1, wherein:
the first and second sets of RF chains comprise analog circuitry configured to cancel self-interference; or
the apparatus further comprises digital circuitry configured to cancel self-interference.

8. The apparatus of claim 1, wherein:
the first set of RF chains comprises, for each of the different frequency bands, a first transmit RF chain to generate RF signals to be output for transmission to a first wireless node during a transmit portion of a time division duplex (TDD) mode and a first receive RF chain to process RF signals obtained from the first wireless node via the lens antenna during a receive portion of the TDD mode; and
the second set of RF chains comprises, for each of the different frequency bands, a second transmit RF chain to generate RF signals to be output for transmission to a second wireless node during a transmit portion of the TDD mode and a second receive RF chain to process RF signals obtained from the second wireless node via the lens antenna during the receive portion of the TDD mode.

9. The apparatus of claim 8, wherein:
the first set of RF chains further comprises, for each of the different frequency bands, a switch configured to route RF signals generated by the first transmit RF chain to the first combiner during the transmit portion of the TDD mode and to route RF signals obtained via the lens antenna from the first combiner to the first receive RF chain during the receive portion of the TDD mode; and
the second set of RF chains further comprises, for each of the different frequency bands, a switch configured to route RF signals generated by the second transmit RF chain to the second combiner during the transmit portion of the TDD mode and to route RF signals obtained via the lens antenna from the second combiner to the second receive RF chain during the receive portion of the TDD mode.

10. The apparatus of claim 1, wherein:
the first set of RF chains comprises at least two RF chains configured to generate RF signals for first and second frequency bands to be output for transmission via the lens antenna to a first wireless node and at least one RF chain configured to process RF signals for at least a third frequency band obtained from the first wireless node via the lens antenna; and
the second set of RF chains comprises at least two RF chains configured to generate RF signals for the first and second frequency bands to be output for transmission via the lens antenna to a second wireless node and at least one RF chain configured to process RF signals for at least the third frequency band obtained from the second wireless node via the lens antenna.

11. The apparatus of claim 10, wherein:
the first and second frequency bands comprise sub 6 GHz frequency bands; and
the third frequency band comprises a millimeter wave (mmWave) frequency band.

12. The apparatus of claim 1, wherein:
the first set of RF chains comprises at least two RF chains configured to generate RF signals for first and second frequency bands to be output for transmission on a first beam via the lens antenna to a first wireless node and at least two RF chains configured to process RF signals for the first and second frequency bands obtained from the first wireless node via the lens antenna on a second beam; and
the second set of RF chains comprises at least two RF chains configured to generate RF signals for the first and second frequency bands to be output for transmission on a third beam via the lens antenna to a second wireless node and at least two RF chains configured to process RF signals for the first and second frequency bands obtained from the second wireless node via the lens antenna on a fourth beam.

13. The apparatus of claim 1, wherein:
the first set of RF chains comprises at least two RF chains configured to generate RF signals for first and second frequency bands to be output for transmission on a first beam via the lens antenna to a first wireless node and at least two RF chains configured to process RF signals for the first and second frequency bands obtained from the first wireless node via the lens antenna on the first beam; and
the second set of RF chains comprises at least two RF chains configured to generate RF signals for the first and second frequency bands to be output for transmission on a second beam via the lens antenna to a second wireless node and at least two RF chains configured to process RF signals for the first and second frequency bands obtained from the second wireless node via the lens antenna on the second beam.

14. The apparatus of claim 1, wherein the lens antenna comprises a meta-material.

15. The apparatus of claim 14, further comprising:
at least one antenna, wherein the apparatus is configured as a wireless node.

16. An apparatus for wireless communications, comprising:
a number of sets of radio frequency (RF) chains (N sets), each RF chain of a given set being configured to generate or process RF signals for a different frequency band; and
a number of combiners (N combiners), each combiner being configured to, for a corresponding one of the N sets, generate a multi-band signal by combining RF signals for different frequency bands generated by at least two of the RF chains of the corresponding set of RF chains and to feed the multi-band signal to a lens antenna for transmission via a first transmit beam.

17. The apparatus of claim 16, wherein:
one or more of the N sets comprise at least two RF chains configured to generate RF signals for first and second frequency bands and at least one RF chain configured to process RF signals for a third frequency band.

18. The apparatus of claim 17, further comprising:
at least one antenna, wherein the apparatus is configured as a wireless node.

19. A method for wireless communications, comprising:
providing a number of sets of radio frequency (RF) chains (N sets), each RF chain of a given set being configured to generate or process RF signals for a different frequency band; and
providing a number of combiners (N combiners), each combiner being configured to, for a corresponding one of the N sets, generate a multi-band signal by combining RF signals for different frequency bands generated by at least two of the RF chains of the corresponding set of RF chains and to feed the multi-band signal to a lens antenna for transmission via a first transmit beam.

20. The method of claim 19, wherein:
one or more of the N sets comprise at least two RF chains configured to generate RF signals for first and second frequency bands and at least one RF chain configured to process RF signals for a third frequency band.

* * * * *